Oct. 19, 1971     E. J. HERBENAR     3,613,201
STAMPED BALL JOINT ASSEMBLY AND METHOD OF MAKING SAME
Filed Jan. 20, 1970
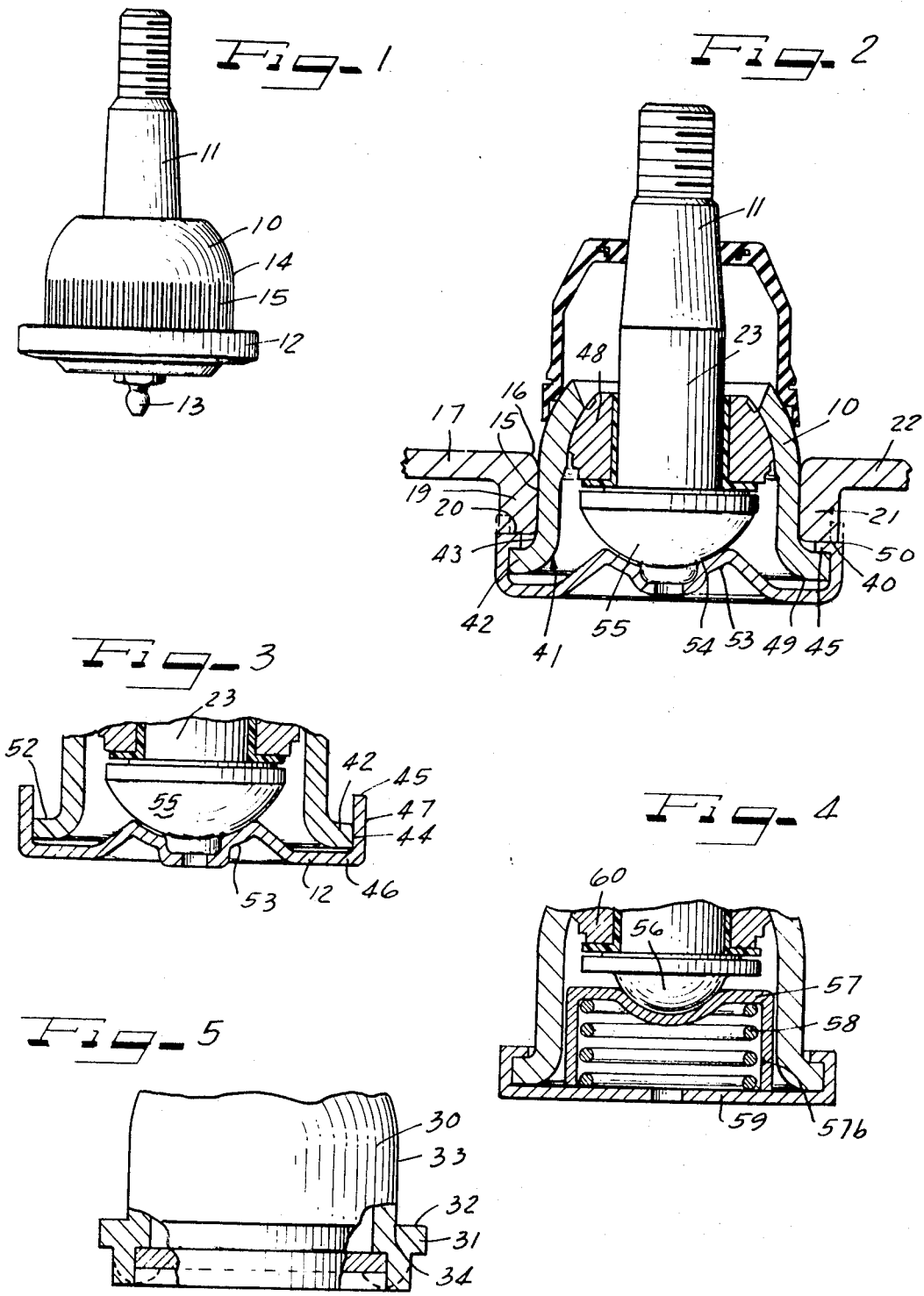
INVENTOR
EDWARD J. HERBENAR
BY *Hill, Sherman, Meroni, Gross & Simpson* ATTORNEYS

United States Patent Office 3,613,201
Patented Oct. 19, 1971

3,613,201
STAMPED BALL JOINT ASSEMBLY AND
METHOD OF MAKING SAME
Edward J. Herbenar, Detroit, Mich., assignor to
TRW Inc., Cleveland, Ohio
Filed Jan. 20, 1970, Ser. No. 4,183
Int. Cl. B23p *11/00;* B21d *39/00*
U.S. Cl. 29—149.5 B       7 Claims

ABSTRACT OF THE DISCLOSURE

A movable stud ball joint assembly having a stamped cup-shaped housing with an open top and bottom with an outturned flange around the open top end. A closure cap is used to close the open top and has a circumferential inturned flange spin-swedged over the outturned flange of the housing to provide a squared flat surface to abut the side of the member in which the housing is inserted.

BACKGROUND OF THE INVENTION

Field of the invention

This invention relates to linkages and more particularly to a movable stud ball joint.

Prior art

Ball joints are well-known to the art. They usually comprise a ball-ended stud which is received in a housing. The housing is generally cup-shaped having both open top and bottom ends with the opening in the bottom end being smaller. The ball on the end of the stud, which may be hemispherical, has a diameter larger than the bottom end opening. The stud is inserted in the housing with the shank of the stud projecting through the open bottom end and the ball retained in the housing proper. A closure plate is usually utilized to close the open top end of the housing. The housing is provided with an inner diameter shoulder adjacent the open top end. The closure plate is inserted into the open end against the shoulder with the remainder of the end then peened over the plate to retain the components in the housing.

In one type of ball joint, the cup housing is inserted into an outturned flange opening in a connecting member, such as a linkage member in a steering linkage for vehicles. In order for the joint to function properly, its tilt or pivot center, located within the housing, must be positioned at a given point with respect to the suspension member in which the housing the housing is inserted. This is usually accomplished by providing the suspension member with an annular flange around the opening which receives the housing, the annular flange having a given axial length. An outer diameter shoulder is then provided on the housing to mate with the end of the flange. When the outer diameter shoulder abuts the end of the flange, the joint housing will be properly positioned.

Because the housing is usually inserted into the suspension arm aperture in a press-fit relationship, the shoulder must project from the housing at a right angle rather than by means of a radius bend. This allows accurate depth control. In the absence of a right-angle or squared shoulder, depth-fitting of the housing into the aperture is difficult to maintain, especially in automated assembly lines.

In order to provide a properly dimensioned shoulder on the housing, it has heretofore been necessary to forge or machine the housing. Press-stamped housing, although much more economical to manufacture, cannot provide the desired shoulder. Normally such stamped housings would provide the shoulder by an outturned flange at the open top of the housing. Stamping necessitates that such a shoulder be a radius bend rather than a right angle. Such a radius bend cannot provide the desired shoulder where it is necessary that the ball joint housing be press-fit received in the aperture of the suspension member.

In such prior art housings, the open end has been closed by a closure disk which is bottomed against an internal shoulder. Because of differences in stackup height of the components received in the housing, it has been difficult to provide a set, predetermined end clearance, usually a zero end clearance, between the comopnents and the closure cap Because of the difficulties of achieving a predetermined or zero end clearance in mass manufactured housings, it has been difficult to set inspection standards, dependent upon axial play or movement of the stud, to determine when wear has been sufficient to require replacement of the joint.

SUMMARY OF THE INVENTION

The present invention overcomes the problems encountered in the prior art and provides for a stamped ball joint housing having a right-angled properly dimensioned shoulder. The housing is stamped with an outturned flange around the open top. The flange, of necessity, has a radius bend at the housing. Thereafter, a cup-shaped closure is inserted over the open end of the housing with its axially extending cylindrical wall overlying the flange and extending axially therebeyond. Thereafter, the closure cap is spin-swedged over the end of the flange. The spin-swedge method provides a flat surface which extends at a right angle from the housing, although the swedged-over portion may not contact the housing on its inner diameter. This then allows the use of a stamped ball joint housing in situations which previously required forged or machined housings.

A spin-swedge machine of the basic type used in connection with this invention is illustrated in U.S. Pat. No. 3,430,327.

Because the closure cap is received circumferentially around the open end of the housing, and is thereafter spin-swedged over the outturned flange to provide the fastening of the closure plate to the housing, it is possible to manufacture the joint of this invention with a predetermined or zero end clearance in each instance. Axial force is applied to the housing or the closure plate during assembly and compresses the components therein to the required load level irrespective of the fact that the closure plate amy not have bottomed against the outturned flange when the components have been loaded into the housing with the desired force. Thus, the components will be stacked up within the housing under a desired load level between the closure plate and the housing trapped components whereby when the closure plate is spin-swedged over the outturned flange to complete the housing, the components will have a predetermined or zero end clearance between them and the closure plate. As wear occurs, axial movement will become possible between the stud end received in the housing and the closure plate. This axial movement can be used to determine when replacement of the components or of the joint is desirable.

It is therefore an object of this invention to provide an improved economical movable stud joint having a squared outer diameter shoulder thereon.

It is another and more specific object of this invention to provide a movable stud ball joint having a stamped housing with an outturned flange around the top end, the end being closed by a closure plate which is spin-swedged over the flange thereby providing a squared outer diameter shoulder for the housing.

It is another object of this invention to provide a movable stud ball joint having a pre-determined or zero end clearance between the stacked components received in the housing and the closure plate, which predetermined clearance can be maintained in mass manufacture.

It is yet another and more specific object of this invention to provide a movable stud ball joint having a cup-shaped stamped metal housing with a small-diameter opening in the bottom end through which the shank of a stud projects, the ball end of the stud being received in the housing, and an outturned stamped flange projecting radially outwardly from the large-diameter open top end, the top end being closed by a cup-shaped closure plate received around the flange and spin-swedged thereonto with a flat shoulder projecting at substantially right angles from the wall of the housing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a plan view of the movable stud ball joint of this invention;

FIG. 2 is a cross-sectional view of the movable stud ball joint of this invention illustrated as received in a suspension member;

FIG. 3 is a detailed view of the bottom of the joint of FIG. 2 prior to swedging;

FIG. 4 is a view similar to FIG. 3 illustrating a different type of movable stud joint;

FIG. 5 is a fragmental partially sectional view of a prior art housing.

DESCRIPTION OF THE PREFFERED EMBODIMENTS

FIG. 1 illustrates a movable stud joint having a housing 10, a stud 11 and an end cap 12 according to this invention. A grease fitting 13 may be fitted into the end cap 12. The outer diameter 14 of the housing 10 may be ribbed as at 15 to lock it into the suspension member in which it is received.

FIG. 2 illustrates a cross section of the joint of FIG. 1 received in an aperture 16 of a suspension member 17. The suspension member 17 may be a portion of a suspension arm in which the aperture 16 has an axially extending annular wall 18 terminating at the bottom end 19 in a flat face 20. In FIG. 2, the aperture 16 is illustrated as being formed by a flange 21 projecting from the main portion 22 of the suspension member.

The joint has a tilt center 23 which is the centerpoint for movement of the stud 11. In order for the suspension to function properly, the tilt center 23 must be positioned at a given point with respect to the suspension member 22. This is illustrated in FIG. 2 as being approximately along the center line of the linkage member 22. In order for the centerpoint 23 to be properly positioned, the housing 10 must be positioned in the aperture 16 to a given depth. This is usually accomplished by abutting a portion of the outer diameter of the housing 10 against the flat annular face 20 of the flange 21 of the linkage member. During production, the face 20 can be set a predetermined distance from the centerpoint of the member 22 of the linkage 17.

However, the housing 10 is fitted in the aperture 16 in a press or interference fit relationship and therefore the shoulder which abuts the face 20 must also be flat and parallel to the face 20. For this reason, as illustrated in FIG. 5, prior art housings 30 have normally had the shoulder 31 with flat face 32 formed by machining or casting so that the face 32 projects outwardly from the outer diameter wall 33 of the housing at a sharp angle 34. If the angle 34 is not sharp, proper depth control is not achieved inasmuch as a radius bend angle will prevent the housing from being inserted into the opening in each case to the point where the face 32 abuts the face 20. Because it is impossible in practice to achieve such a sharp bend with a stamped housing, the more expensive machined or cast housings have heretofore been used.

The present invention provides for a flat shoulder 40 to mate with the face 20 in association with a stamped radius bend housing. The top 41 of the cup-shaped housing 10 is open and has an outwardly directed flange 42. The flange is bent outwardly from the outer diameter 15 of the housing through a radius bend 43. Thereafter, a closure cap 12 having an inner diameter 44 equal to or greater than the outer diameter of the flange 42 is used to close the top 41. The open end of the cup-shaped housing 45 extends from the closed end or bottom 46 of the housing a distance greater than the thickness of the flange 42 so that when the closure plate 12 is slipped over the open end of the housing as illustrated in FIG. 3, the outer diameter wall 47 will project axially beyond the flange 42.

The distance by which the end 45 projects beyond the flange 42 will be dependent upon the dimensions of the ball ended stud 11 and bearing blocks 48 within the housing. In assembling the retaining cap 12 onto the housing, it is thrust against the components with a desired amount of assembly force so as to properly lock the components in the housing. Thereafter, the end 45 is spin-swedged over the flange 42 as illustrated in FIG. 2. It can be seen from a comparison of FIGS. 2 and 3 that the amount of material of the retainer cap spin-swedged over the flange 42 would be greater in FIG. 3 than in FIG. 2 due to the fact that the cap 12 bottoms against the flange 42 in FIG. 3, while a gap 49 exists between the cap and the flange in FIG. 2. This is to illustrate a possible difference in stacking height of the components fitted into the housing or a difference in assembly pressures.

Because the components are pressed against the retainer cap with a given amount of force during assembly of the joint, although end clearance between the closure cap and the housing may vary, as in FIGS. 2 and 3, the end clearance between the stud end 55 and the closure cap 12 can be predetermined or, preferably, can be set at zero. Thereafter, any change in such end clearance, as will be caused by wear between the stud end 55 and the closure cap, will result in the allowance of axial movement of the stud. This axial movement is susceptible of measurement so that inspection standards may be set which call for the predetermined replacement of the joint dependent upon end clearance or axial movement of the stud with respect to the closure cap. It is to be understood that the end clearance is dependent only upon the stud and the closure cap and is independent of any clearance between the outturned flange and the closure cap.

The end 45 is spin-swedged over the flange in such a manner that it produces a right-angled bend 50 at the outer diameter of the cap. This provides the flat face 40 to mate with the face 20 of the suspension member. In the spin swedging of the cap. sufficient force is exerted to deform the metal of the cap to provide a close fit around the flange with the desired flat face at the top. In those instances where the amount of material swedged over on top of the flange is great enough to cause the inner diameter of the swedged-over material to contact the radius bend 43 of the housing, the metal of the cap will be deformed to conform with this bend while retaining the flat face 40.

During the spin-swedging operation, the inner diameter of the retaining cap is brought into contact with the outer diameter of the flange. Normally the contact is great enough to prevent turning of the cap around the housing, however, as an alternative, surface irregularities can be produced in the outer diameter of the flange and swedging of the cap will force cap material into these irregularities to lock the cap against rotation.

It can therefore be seen that this method allows the formation of a flat mating surface 40 positioned sufficiently above the top surface 52 of the radius bend flange so as to be able to mate with the flat face 20 of the linkage flange at a point radially outwardly from the cylindrical wall portion 15 of the housing. In this manner, the housing will continue to have the desired circumferentially axially straight surface for press-fitting into the linkage member 17 while maintaining mating flat faces between the linkage member and the joint which will accurately position the tilt center 23 with respect to the linkage member while allowing the housing to be stamped. The positioning of the tilt center 23 will be determined by the positioning of the stud in the housing together with the thickness of the flange 42 and the swedged-over cap. Inasmuch as all three of these are knowable factors, they can be controlled so as to provide the desired tilt center placement.

FIGS. 2 and 3 illustrate a closure cap 12 with a deformed central area 53 which provides a seating surface 54 for the ball 55 of the ball-ended stud 11. FIG. 4 illustrates a modified embodiment where the ball end 56 of the stud is seated against a deformed member 57 received in the housing. The member 57 has an axially extending cylindrical portion 57b which bottoms against the closure cap 59. This allows for the setting of the predetermined or zero end clearance between the component, including the member 57, and the end cap. Thereafter, as wear occurs between the ball end 56 of the stud and the member 57, the spring 58 will serve as a wear takeup device providing a continuous cross pressure against the ball end 56 of the stud whereby wear of the bearing part 60 will be accommodated. However, end clearance, caused by wear, may still be measured by providing an axial thrust against the stud sufficient to overcome the force of the spring. This again allows the setting of inspection standards before determining frictional wear.

FIG. 4 illustrates the closure cap 59 as bottomed against the outturned flange of the housing as opposed to FIGS. 2 and 3 which illustrate varying clearances therebetween. This is illustrative of the fact that the stacking height of the components may differ such that the clearance between the closure cap and the flange when the components are stacked to the desired pressure, can be of varying sizes and degrees.

It can therefore be seen from the above that my invention provides a new construction for a movable stud ball joint which allows the use of a stamped housing while maintaining a specifically located flat outer diameter shoulder on the housing provided by a spin-swedged closure cap. The flat outer shoulder extends radially from a cylindrical portion of the housing and may be radially spaced therefrom so that the housing may be fitted in a linkage aperture to a specified depth without interference otherwise caused by a radius bend such as the type inherently produced in the stamping operation.

Although the teachings of my invention have herein been discussed with reference to specific theories and embodiments, it is to be understood that these are by way of illustration only and that others may wish to utilize my invention in different designs or applications.

I claim as my invention:

1. A movable stud ball joint comprising a cup-shaped housing having a small diameter opening in one end thereof and a large diameter opening in the other end thereof, a ball ended stud received in said housing with the shank thereof projecting through the small diameter end, a radially extending flange projecting outwardly from the large-diameter end at a radius bend, a closure cap, said closure cap being cup-shaped and having an axially extending outer diameter wall, the inner diameter of said outer diameter wall at least as great as the outer diameter of the said flange, the said closure cap received over the large-diameter open end of the said housing with the axially extending outer diameter wall of the said cap overlying the said flange and the bottom wall of the said cap closing the said large diameter opening of the said housing, and the ends of the said axially extending outer diameter walls of the said cap spin-swedged over the said flange forming a radially extending flat surface axially beyond the said flange.

2. A method of making a movable stud ball joint assembly which comprises: stamping a joint housing with a cup shape with a small diameter opening in the bottom of the cup, a larger diameter opening in the top of the cup and with an outturned radially extending flange projecting from the top and terminating in a flat outer diameter, stacking the components of the joint in the housing with the shank of a ball-ended stud projecting through the small diameter opening in the bottom of the housing, closing the large diameter opening in the top of the housing with a cup-shaped closure cap having a cylindrical side wall, the side wall radially overlying the outer diameter of the flange and having portions thereof extending axially beyond the flange towards the bottom of the said housing, applying a force to bias the said cap towards the said housing, and spin swedging the portion of the cylindrical wall of the cap which extends axially beyond the flange radially inwardly to lock the said cap to the said flange forming a radially extending wall on the said cap between the said flange and the bottom of the said housing.

3. A movable stud ball joint comprising: a stamped cup-shaped housing, a radially outwardly directed flange at one end of said housing, said flange integral with said housing through a radius bend, a cup-shaped closure cap, said closure cap closing the said end and having a cylindrical portion extending axially beyond the said flange, the said closure cap spin-swedged over the said flange and the said closure cap having a radially extending wall axially beyond the said flange forming a radially extending abutment shoulder for the said housing.

4. A movable stud ball joint comprising a housing, said housing having a small diameter opening in one end, a cylindrical portion intermediate the ends and a large diameter opening in the other end, an outturned flange extending from the said other end integral with the said cylindrical portion through a radius bend, ball-ended stud received in said housing with the ball end thereof enclosed in said housing and the shank thereof projecting through the said small diameter end, a closure cap, said closure cap being substantially cup-shaped having a bottom wall, a cylindrical outer diameter wall and a radially inwardly projecting flange integral with the cylindrical wall spaced from the bottom wall, said closure cap positioned around the said flange of the said housing closing the said large diameter opening with the bottom wall positioned on one side of the said flange and the radially inwardly directed flange of the closure cap positioned on the other side thereof, the said flange of the said closure cap having a surface projecting at substantially a right angle from the cylindrical portion of the housing whereby a radial abutment shoulder is provided.

5. The ball joint of claim 4 wherein the said inturned flange of the said closure cap has its inner diameter terminating in spaced relationship from the outer diameter of the cylindrical portion of the housing.

6. The ball joint of claim 4 wherein the bottom wall of the closure cap is spaced from the flange of the said housing.

7. The ball joint of claim 4 wherein the outer diameter of the housing flange has surface irregularities and the inner diameter of the cylindrical portion of the closure cap has portions thereof conforming with the said surface irregularities to prevent rotation of the cap on the housing.

References Cited

UNITED STATES PATENTS

| 3,395,441 | 10/1965 | Herbenar | 29—441 |
| 3,395,442 | 3/1967 | Herbenar | 29—511 X |
| 3,430,327 | 2/1968 | Herbenar | 29—243.52 |
| 3,464,723 | 2/1968 | Herbenar | 287—87 |

THOMAS H. EAGER, Primary Examiner

U.S. Cl. X.R.

29—441, 511; 287—87

UNITED STATES PATENT OFFICE
CERTIFICATE OF CORRECTION

Patent No. 3,613,201　　　　　　　　　　Dated October 19, 1971

Inventor(s) Edward J. Herbenar

It is certified that error appears in the above-identified patent and that said Letters Patent are hereby corrected as shown below:

Column 2, line 3, "housing", second occurrence should read -- housings --;

Col. 2, line 17, "comopnents" should be --components--;
　　Col. 2, line 54, "amy" should be --may--.
　　Col. 4, line 66, "cap. sufficient" should be --cap, sufficient--.

In the claims:

Claim 4, line 6, insert --a-- before "ball-ended".

Signed and sealed this 28th day of November 1972.

(SEAL)
Attest:

EDWARD M. FLETCHER, JR.
Attesting Officer

ROBERT GOTTSCHALK
Commissioner of Patents